United States Patent [19]
Wille

[11] 3,915,948

[45] Oct. 28, 1975

[54] SARCOSYL-L-ARGINYL-L-VALYL-L-TYROSYL-L-VALYL-L-HISTIDYL-L-PROLINE

[75] Inventor: Myles A. Wille, Norwich, N.Y.

[73] Assignee: Morton-Norwich Products, Inc., Norwich, N.Y.

[22] Filed: Aug. 5, 1974

[21] Appl. No.: 494,562

[52] U.S. Cl................................ 260/112.5; 424/177
[51] Int. Cl.² ................ C07C 103/52; A61K 37/00
[58] Field of Search .................................. 260/112.5

[56] References Cited
UNITED STATES PATENTS

| | | | |
|---|---|---|---|
| 3,652,531 | 3/1972 | Miyoshi et al. | 260/112.5 |
| 3,832,337 | 8/1974 | Ondetti et al. | 260/112.5 |

*Primary Examiner*—Lewis Gotts
*Assistant Examiner*—Reginald J. Suyat
*Attorney, Agent, or Firm*—Anthony J. Franze

[57] ABSTRACT

The title compound is a potent inhibitor of the hypertensive agent angiotensin II.

1 Claim, No Drawings

SARCOSYL-L-ARGINYL-L-VALYL-L-TYROSYL-L-VALYL-L-HISTIDYL-L-PROLINE

This invention relates to peptides. More particularly it is concerned with a heptapeptide sarcosyl-L-arginyl-L-valyl-L-tyrosyl-L-valyl-L-histidyl-L-proline. It is useful as an antihypertensive agent. Such antihypertensive effect is demonstrated by its ability to inhibit the powerful hypertensive agent angiotensin II in the rabbit aortic strip method, a method described in Circulation Research XXIX:664–672 (1971). In accordance with that test the compound of this invention displayed a $pA_2$ value of $7.45 \pm 0.4$ (n= 5), the $pA_2$ value being the negative logarithm of the molar concentration of a competitive antagonist which reduces the effect of a double concentration of agonist to that of a single one [British Journal of Pharmacology 2:189–206 (1947)].

The compound of this invention is readily prepared using conventional methods for the synthesis of peptides. The method employed for its preparation is briefly described:

A. Sar-($NO_2$)Arg-Val-(Bzl)Tyr-Val($N^{im}$-Bzl)His-Pro-polymer

Boc-Pro resinester (5 g, 0.57 mmole/g) was placed in a rocking Merrifield type reaction vessel. The resin was swollen in dichloromethane overnight and thereafter washed with three 50 ml portions of dichloromethane. All wash operations were repeated three times for 3 min. The t-butyloxy carbonyl (Boc) protecting group was removed by treatment with trifluoroacetic acid/dichloromethane (1:1) for 30 min. The resin was washed with dichloromethane and the trifluoroacetate was neutralized by treating with 10% triethylamine/dichloromethane for 10 min. The resin was then washed with dimethylformamide/dichloromethane (1:4) and dicyclohexyl carbodiimide (DCC), 8.6 mmole, in this solvent, was added. After rocking 2 min a threefold excess (8.6 mmole) Boc-$N^{im}$-Bzl-His in dimethylformamide/dichloromethane (1:4) was added, and the reaction mixture rocked for 4 hrs. Thereafter the operations of deprotection, neutralization, and coupling were repeated for each amino acid, employing dichloromethane as the coupling solvent for all the other amino acids except Boc-($NO_2$)Arg($DMF/CH_2Cl_2$).

After the last coupling step the resin-peptide was washed with dimethylformamide, ethanol, and then dried in vacuo over $P_2O_5$.

B. Sar-($NO_2$)Arg-Val-Tyr-Val-(Bzl)His-Pro·HBr

Resin peptide (A), 4.02, was suspended in 50 ml dry trifluoroaceticacid and a stream of dry HBr was passed through at a slow rate. After 45 min the resin was filtered and treated again with HBr/trifluoroacetic acid as described. The filtrates were concentrated in vacuo at 30° to an oil, and the residues were triturated with absolute ether and combined to afford B (1.49 g) as an amorphous solid.

C. Sar-Arg-Val-Tyr-Val-His-Pro

The protected peptide (B), 1.49 g, was dissolved in 50 ml of 50% aq. acetic acid (v/v) and hydrogenolyzed over a mixture of 5% $Pd/BaSO_4$ (150 mg) and 10% Pd/C (150 mg) catalysts for 72 hrs. The catalysts were removed by filtration, the same amounts of fresh catalyst were added, and the hydrogenolysis continued. After 48 hrs. the mixture was filtered, the filtrate diluted with water and the solution lyophilized. The resulting 1.34 g solid was hydrogenolyzed an additional 48 hrs as described. The yield of crude peptide (C) was 1.16 g.

The crude product was purified by ion exchange chromatography on Sephadex SP-C-25 (2.5 cm × 85 cm) using an ammonium acetate gradient (0.4 → 0.8 M) in 1 M AcOH.

TLC: Merck Silica Gel 60 F-254 plates, with n-butanol-acetic acid-water (6:2:3 v/v) solvent system, $R_f$ = 0.02; n-butanol acetic-acid-pyridine-water (9:2:7:6 v/v) solvent system, $R_f$ = 0.18.

Amino acid analysis (conc. HCl/4 hrs/140°):
Pro, 1.00; His, 0.95; Val, 1.96; Tyr, 0.94; Arg, 0.98; Sar, 0.98 $[\alpha]_D^{20}$ = −66° (C = 0.55, N AcOH)

What is claimed is:

1. Sarcosyl-L-arginyl-L-valyl-L-tyrosyl-L-valyl-histidyl-L-proline.

* * * * *